United States Patent
Paek et al.

(10) Patent No.: US 11,175,898 B2
(45) Date of Patent: Nov. 16, 2021

(54) COMPILING CODE FOR A MACHINE LEARNING MODEL FOR EXECUTION ON A SPECIALIZED PROCESSOR

(71) Applicant: Apple Inc., Cupertino, CA (US)

(72) Inventors: Timothy S. Paek, Sammamish, WA (US); Francesco Rossi, Sunnyvale, CA (US); Jamil Dhanani, San Francisco, CA (US); Keith P. Avery, Sunnyvale, CA (US); Minwoo Jeong, Sammamish, WA (US); Xiaojin Shi, Cupertino, CA (US); Harveen Kaur, Santa Clara, CA (US); Brandt M. Westing, Seattle, WA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/583,191

(22) Filed: Sep. 25, 2019

(65) Prior Publication Data

US 2020/0379740 A1 Dec. 3, 2020

Related U.S. Application Data

(60) Provisional application No. 62/855,840, filed on May 31, 2019.

(51) Int. Cl.
*G06F 9/44* (2018.01)
*G06F 8/41* (2018.01)
(Continued)

(52) U.S. Cl.
CPC .............. *G06F 8/447* (2013.01); *G06F 8/60* (2013.01); *G06N 3/04* (2013.01); *G06N 3/082* (2013.01)

(58) Field of Classification Search
None
See application file for complete search history.

(56) References Cited

U.S. PATENT DOCUMENTS

| 10,685,295 B1* | 6/2020 | Ross | G06F 9/5016 |
| 2008/0016014 A1* | 1/2008 | Sigal | G06N 3/02 |
| | | | 706/15 |

(Continued)

FOREIGN PATENT DOCUMENTS

| WO | WO 2018/222299 | 12/2018 |
| WO | WO 2019/033380 | 2/2019 |

OTHER PUBLICATIONS

Chen et al., "TVM: An Automated End-to-End Optimizing Compiler for Deep Learning," 2018 (Year: 2018).*

(Continued)

*Primary Examiner* — Insun Kang
(74) *Attorney, Agent, or Firm* — Morgan, Lewis & Bockius LLP

(57) ABSTRACT

The subject technology receives a neural network model in a model format, the model format including information for a set of layers of the neural network model, each layer of the set of layers including a set of respective operations. The subject technology generates neural network (NN) code from the neural network model, the NN code being in a programming language distinct from the model format, and the NN code comprising a respective memory allocation for each respective layer of the set of layers of the neural network model, where the generating comprises determining the respective memory allocation for each respective layer based at least in part on a resource constraint of a target device. The subject technology compiles the NN code into a binary format. The subject technology generates a package for deploying the compiled NN code on the target device.

20 Claims, 8 Drawing Sheets

(51) Int. Cl.
*G06F 8/60* (2018.01)
*G06N 3/04* (2006.01)
*G06N 3/08* (2006.01)

(56) References Cited

U.S. PATENT DOCUMENTS

| | | | |
|---|---|---|---|
| 2015/0100529 A1* | 4/2015 | Sarah | G06N 3/049 |
| | | | 706/25 |
| 2015/0134583 A1* | 5/2015 | Tamatsu | G06N 3/08 |
| | | | 706/25 |
| 2017/0140273 A1* | 5/2017 | Sagher | G06N 3/0454 |
| 2018/0088996 A1* | 3/2018 | Rossi | G06F 9/5016 |
| 2018/0136912 A1* | 5/2018 | Venkataramani | G06N 3/0454 |
| 2018/0181378 A1* | 6/2018 | Bakman | G06F 8/65 |
| 2018/0285715 A1* | 10/2018 | Son | G06N 3/08 |
| 2018/0293057 A1* | 10/2018 | Sun | G06N 3/105 |
| 2018/0300616 A1* | 10/2018 | Ambardekar | G06F 15/8007 |
| 2018/0330235 A1* | 11/2018 | Lin | G06N 3/063 |
| 2018/0349189 A1* | 12/2018 | Rossi | G06N 3/02 |
| 2018/0373976 A1* | 12/2018 | Woo | G06F 9/5016 |
| 2019/0080239 A1* | 3/2019 | Yang | G06N 3/0445 |
| 2019/0114533 A1* | 4/2019 | Ng | G06N 3/04 |
| 2019/0251424 A1* | 8/2019 | Zhou | G06N 3/0481 |
| 2019/0259144 A1* | 8/2019 | Pathapati | G06N 20/00 |
| 2019/0340010 A1* | 11/2019 | Lee | G06N 7/08 |
| 2020/0019882 A1* | 1/2020 | Garg | G06F 8/60 |
| 2020/0065671 A1* | 2/2020 | Sahni | G06N 3/0454 |
| 2020/0082274 A1* | 3/2020 | Rossi | G06N 3/08 |
| 2020/0104039 A1* | 4/2020 | Robertson | G06F 3/0485 |
| 2020/0104722 A1* | 4/2020 | Wu | G06N 5/022 |
| 2020/0151579 A1* | 5/2020 | Yang | G06N 3/063 |
| 2020/0167193 A1* | 5/2020 | Rossi | G06N 3/063 |
| 2020/0183476 A1* | 6/2020 | Honnavara-Prasad | |
| | | | G06F 1/329 |
| 2020/0210840 A1* | 7/2020 | Darvish Rouhani | |
| | | | G06F 9/30025 |
| 2020/0249998 A1* | 8/2020 | Che | G06N 3/08 |
| 2020/0250583 A1* | 8/2020 | Hammond | G06F 9/4881 |
| 2020/0293868 A1* | 9/2020 | Mital | G06F 9/4881 |
| 2020/0294195 A1* | 9/2020 | Wang | G06N 3/063 |
| 2020/0302292 A1* | 9/2020 | Tseng | G06N 3/063 |
| 2020/0320366 A1* | 10/2020 | Wang | G06N 3/08 |
| 2020/0334544 A1* | 10/2020 | Liu | G06N 3/105 |

OTHER PUBLICATIONS

International Search Report and Written Opinion from PCT/US2020/029937, dated Aug. 12, 2020, 16 pages.

* cited by examiner

COMPILING CODE FOR A MACHINE LEARNING MODEL FOR EXECUTION ON A SPECIALIZED PROCESSOR

CROSS-REFERENCE TO RELATED APPLICATIONS

The present application claims the benefit of U.S. Provisional Patent Application Ser. No. 62/855,840, entitled "Compiling Code for a Machine Learning Model for Execution on a Specialized Processor," filed May 31, 2019, which is hereby incorporated by reference in its entirety for all purposes.

TECHNICAL FIELD

The present description generally relates to compiling neural network model source code for execution on a target platform, including compiling neural network model source code for execution on a specialized processor, such as a resource-constrained processor.

BACKGROUND

Software engineers and scientists have been using computer hardware for machine learning to make improvements across different industry applications including image classification, video analytics, speech recognition and natural language processing, etc. Notably, neural networks are being utilized more frequently to create systems that can perform different computing tasks based on training from sizable amounts of data.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
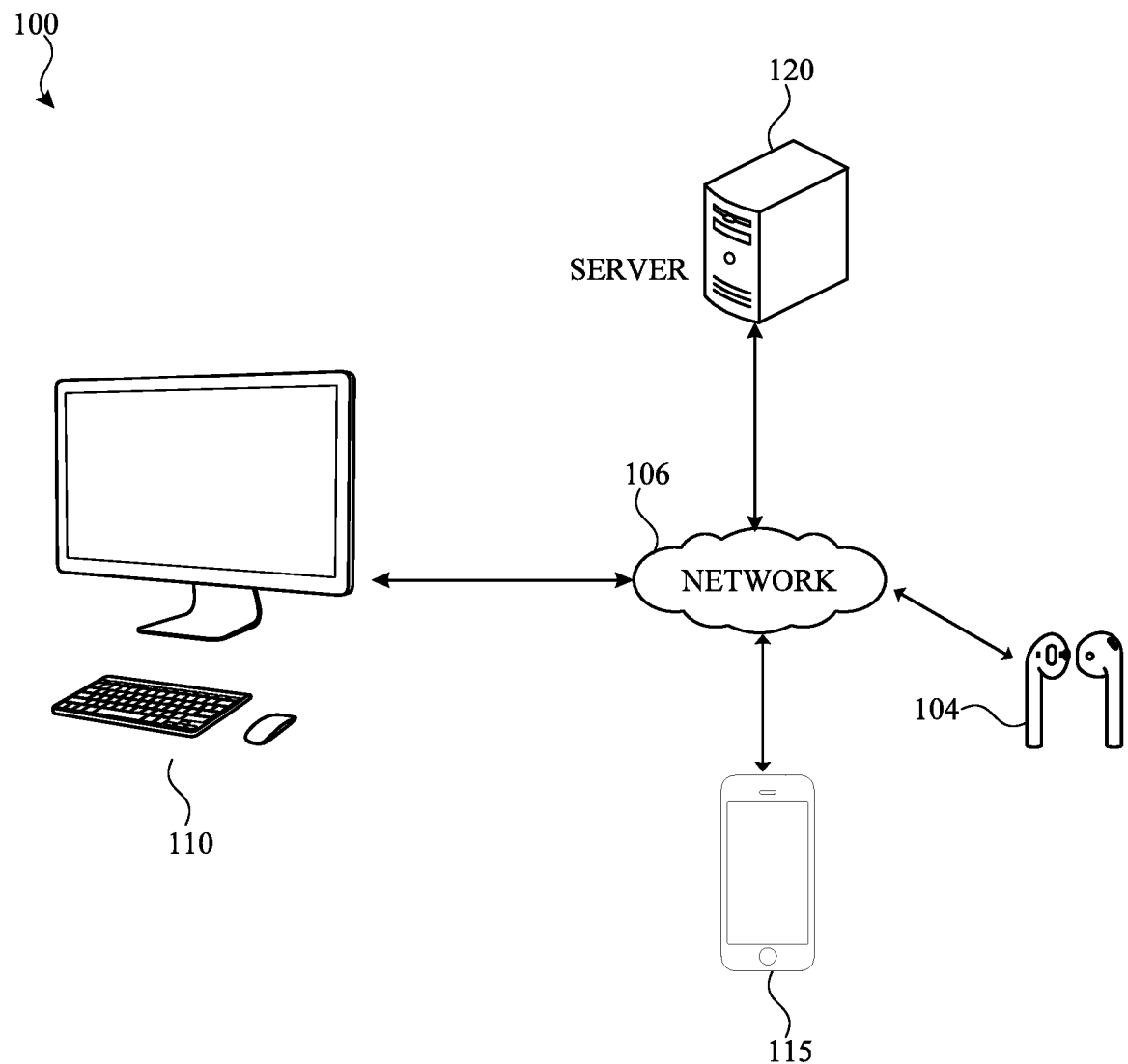
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a meteoric rise in popularity in recent years due to the availability of massive amounts of training data, and advances in more powerful and efficient computing hardware. A common approach is utilizing a graphical processing unit (GPU) for training a deep neural network, and also for executing the deep neural network on new input data post-training. Moreover, as discussed further below, specialized, custom, and/or dedicated hardware, such as low-power specialized processors that may be always powered on (e.g., to detect audio triggers, collect and process sensor data from integrated accelerometers, gyroscopes and compasses, and the like), may be provided to perform certain operations in a more computationally and/or power efficient manner. However, when deploying a given deep neural network for execution on a target platform and/or target processor on the target platform, depending on the available hardware, resource constraints (e.g., memory and/or computing) can be encountered that may limit the execution of a given neural network. For example, to enable deployment of a neural network model on a specialized processor that has less computing power than a main processor (e.g., CPU) may require modifications to the neural network model that make it compatible with the architecture of the specialized processor. Without such modifications, the neural network model, when running on the specialized processor, can require usage of another processor, such as the CPU, in order to perform some of operations of the neural network model resulting in further consumption of power/memory/computing resources.

Moreover, as discussed further herein, a given electronic device may include a specialized processor that may be always powered on and/or in an active mode, e.g., even when a host/application processor of the device is in a low power mode or in an instance where such an electronic device does not include a host/application processor (e.g., a CPU and/or GPU). Such a specialized processor may be a low computing power processor that is engineered to also utilize less energy than the CPU or GPU, and also is designed, in an example, to be running continuously on the electronic device in order to collect audio and/or sensor data. In an example, such a specialized processor can be an Always On Processor (AOP), which is a small and low power auxiliary processor that is implemented as an embedded motion coprocessor, as provided in an electronic device such as an iPhone® or AirPods®. In existing solutions, running a machine learning model on such a low computing power specialized processor was not feasible due to incompatibility with the structural and/or operational requirements of running the machine learning model (e.g., which may require the additional computing power of a CPU or GPU and/or memory requirements).

Implementations of the subject technology described herein reduce the memory footprint of a neural network by providing code that reuses memory portions as well as allocates all memory at compile time, e.g., before the neural network is run, based on the resource constraints of the given target device/specialized processor. Further, the performance of the neural network may improve by avoiding using dynamic memory allocation and deallocation techniques, which are often performed during running of the neural network model. Additionally, some processors may not allow for or may not feasibly perform dynamic memory allocations, such as some specialized processors provided on a given electronic device. Thus, the subject technology described herein enables a neural network to be run on such specialized, e.g. resource-constrained, processors. These benefits therefore are understood as improving the computing functionality of a given electronic device, such as an end user device which may generally have less computational resources available than, e.g., one or more cloud-based servers.

FIG. 1 illustrates an example network environment 100 for in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes a wireless audio output device 104, an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. In FIG. 1, the wireless audio output device 104 is illustrated as not being directly coupled to the network 106; however, in one or more implementations, the wireless audio output device 104 may be directly coupled to the network 106. For explanatory purposes, the network environment 100 is illustrated in FIG. 1 as including the wireless audio output device 104, the electronic device 110, the electronic device 115, and the server 120; however, the network environment 100 may include any number of electronic devices and any number of servers.

The wireless audio output device 104 may be, for example, a wireless headset device, one or more wireless earbuds, a smart speaker, or generally any device that includes audio output circuitry and one or more wireless interfaces, such as near-field communication (NFC) radios, WLAN radios, Bluetooth radios, Zigbee radios, and/or other wireless radios. In FIG. 1, by way of example, the wireless audio output device 104 is depicted as a set of wireless earbuds. The wireless audio output device 104 may be, and/or may include all or part of the electronic system discussed below with respect to FIG. 8. The wireless audio output device 104 may be paired, such as via Bluetooth, with one or more of the electronic devices 110 and/or 115. In an implementation, the wireless audio output device 104 may not include a main processor such as a CPU and/or a GPU and instead only may include a specialized processor as discussed further below in FIG. 2.

The electronic device 110 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a desktop computer. The electronic device 110 may be, and/or may include all or part of, the electronic system discussed below with respect to FIG. 8.

In one or more implementations, the electronic device 110 may provide a system for transforming neural network models into code in a particular programming language (e.g., C code) as described herein. In particular, the subject system may include a neural network compiler for compiling the code. In an example, the subject system, using the compiled code, can create an executable software package for deployment on a target platform, such as the electronic device 115, with facilitation from the server 120. When executing the compiled code, the target platform can perform a given operation(s) of the neural network model on a specialized processor provided on the target platform.

The electronic device 115 may be, for example, a portable computing device such as a laptop computer, a smartphone, a peripheral device (e.g., a digital camera, headphones), a tablet device, a wearable device such as a watch, a band, and the like, or any electronic device. The electronic device may further include processors having different compute capabilities, including, for example, a CPU, a GPU, a neural processor and/or a specialized processor. In FIG. 1, by way of example, the electronic device 115 is depicted as a smartphone device. In one or more implementations, the electronic device 115 may be, and/or may include all or part of, the electronic device discussed below with respect to the electronic system discussed below with respect to FIG. 8.

In one or more implementations, the server 120 deploys the compiled code included in an executable software package to a target device for execution. In one or more implementations, the server 120 may transmit the executable software package to an intermediate device, such as the electronic device 115, for deployment on a target device, such as the wireless audio output device 104. The wireless audio output device 104, in an example, may be a target device for receiving the software package with the compiled neural network code and for executing the compiled code in a runtime environment of the wireless audio output device 104. As described further herein, the subject technology advantageously enables the wireless audio output device 104 to run the compiled neural network code without utilizing a framework. A framework can refer to a software environment that provides particular functionality as part of a larger software platform to facilitate development of software applications.

Figure 2:
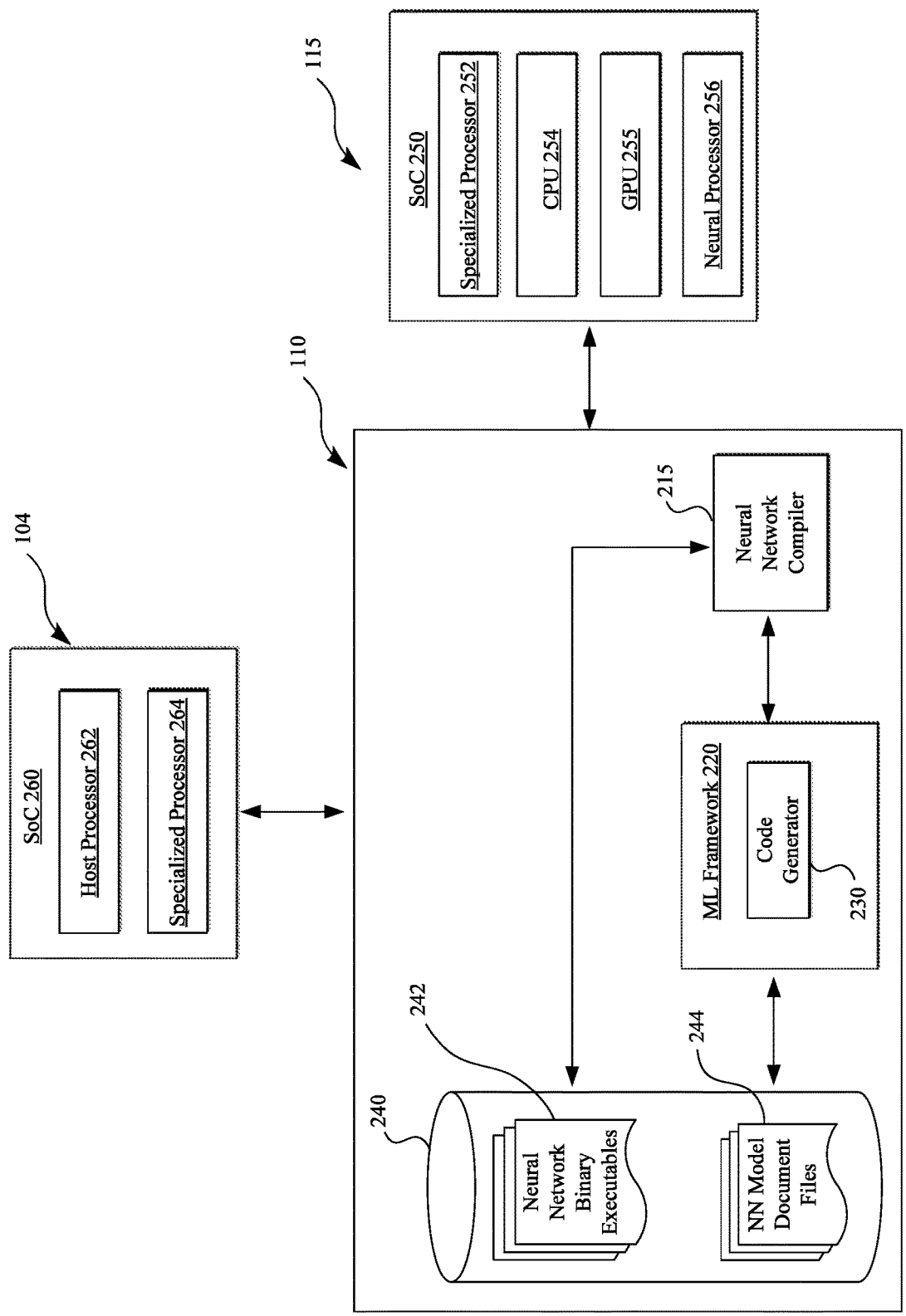
FIG. 2 illustrates an example software architecture for generating code for neural networks for execution on a specialized processor in accordance with one or more implementations.

FIG. 2 illustrates an example software architecture for generating code for neural networks for execution on a specialized processor in accordance with one or more implementations. For explanatory purposes, the software architecture is described as being provided by the electronic device 110 of FIG. 1, such as by a processor and/or memory of the electronic device 110; however, the software architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the software architecture includes a machine learning (ML) framework 220 that includes a code generator 230, and a neural network compiler 215. A memory 240 includes neural network model document files 244. In an example, each of the neural network model document files 244 can at least include information that represents a set of operations that are to be performed by corresponding nodes from different layers of a given neural network model. Further, information including descriptions of input and output feature(s), data structures, and feature types may be included in a given neural network model document file.

The code generator 230 can take a NN model document file from the neural network model document files 244 and transform the NN model document file into code in a particular programming language to execute, once compiled, on a specialized processor of a target device. The neural network compiler 215 takes the generated code from the code generator 230 and compiles the code into a neural network binary executable, which can be stored in neural network executables 242 and then be deployed to one or more different target devices for execution (e.g., the wireless audio output device 104). Although the code generator 230 is shown as being separate from the neural network compiler 215 for purposes of explanation, in at least one implementation, the code generator 230 may be part of the neural network compiler 215 such that the neural network compiler 215 can transform a given network model file and generate code in a particular programming language that is subsequently compiled by the neural network compiler 215.

Although the neural network compiler 215 is provided on the electronic device 110 in the example of FIG. 2, in some implementations, such a compiler may be provided on a particular electronic device that compiles code for a neural network model and executes the compiled neural network model on the same device.

As discussed above, a neural network model can be compiled for a specific target platform and then deployed to a different device such as the wireless audio output device 104 for execution.

As illustrated, wireless audio output device 104 includes a system-on-chip (SOC) 260. The SOC 260 includes a host processor 262, and a specialized processor 264. The host processor 262 may include suitable logic, circuitry, and/or code that enable processing data and/or controlling operations of the wireless audio output device 104. In this regard, the host processor 262 may be enabled to provide control signals to various other components of the wireless audio output device 104, respectively. Additionally, the host processor 262 may enable implementation of an operating system or otherwise execute code to manage operations of the wireless audio output device 104. In an implementation, the specialized processor 264 is a processor that is considered "always on" and continuously runs on the wireless audio output device 104. In this implementation, certain machine learning applications can advantageously execute on the specialized processor 264 such as for predicting the movement of a person based on sensor data, detecting voice spoken voice triggers, among other types of machine learning applications. In an example, the specialized processor 264 may be utilized to execute operations from a compiled neural network model. In one or more implementations, wireless audio output device 104 may communicate directly with the server 120. In one or more implementations, the wireless audio output device 104 may only include the specialized processor 264 (e.g., exclusive of the host processor 262).

As further illustrated, the electronic device 115, in an implementation, includes a system-on-chip (SOC) 250. The SOC 250 includes a specialized processor 252, a CPU 254, and a GPU 255, and a neural processor 256, which may be utilized to execute operations from a compiled neural network model. In an implementation where the specialized processor 252 is a processor that is considered "always on" and continuously runs on the electronic device 115, certain machine learning applications can advantageously execute on such a specialized processor such as for predicting the movement of a person based on sensor data, detecting voice spoken voice triggers, among other types of machine learning applications.

As discussed further herein, the code generator 230 can generate corresponding code based on a given neural network model file from the neural network model document files 244, which can be compiled by the neural network compiler 215 for execution solely on the specialized processor 264 provided by the wireless audio output device 104.

A CPU, as discussed herein, can refer to a main processor in a given electronic device that performs operations for basic arithmetic, logical, control and input/output operations specified by the instructions of a computer program or application, including some operations for neural network models. A GPU, as discussed herein, can refer to a specialized electronic circuit designed to perform operations for rendering graphics, which is also being utilized in many instances to process computational workloads for machine learning operations (e.g., as specified by instructions of a computer program or application). The CPU, GPU, neural processor, and specialized processor may each have different computational specifications and capabilities depending on their respective implementations where each of the aforementioned components can provide varying degrees of performance for certain operations in comparison with the other components.

Recently, specialized (e.g., dedicated) hardware has been developed that is optimized for performing particular operations from a given NN. A given electronic device may include a neural processor, which can be implemented as circuitry that performs various machine learning operations based on computations including multiplication, adding and accumulation. Such computations may be arranged to perform, for example, convolution of input data. A neural processor, in an example, is specifically configured to perform machine learning algorithms, typically by operating on predictive models such as NNs. In one or more implementations, an electronic device may include a specialized processor and/or a neural processor in addition to a CPU and/or a GPU.

Figure 3:
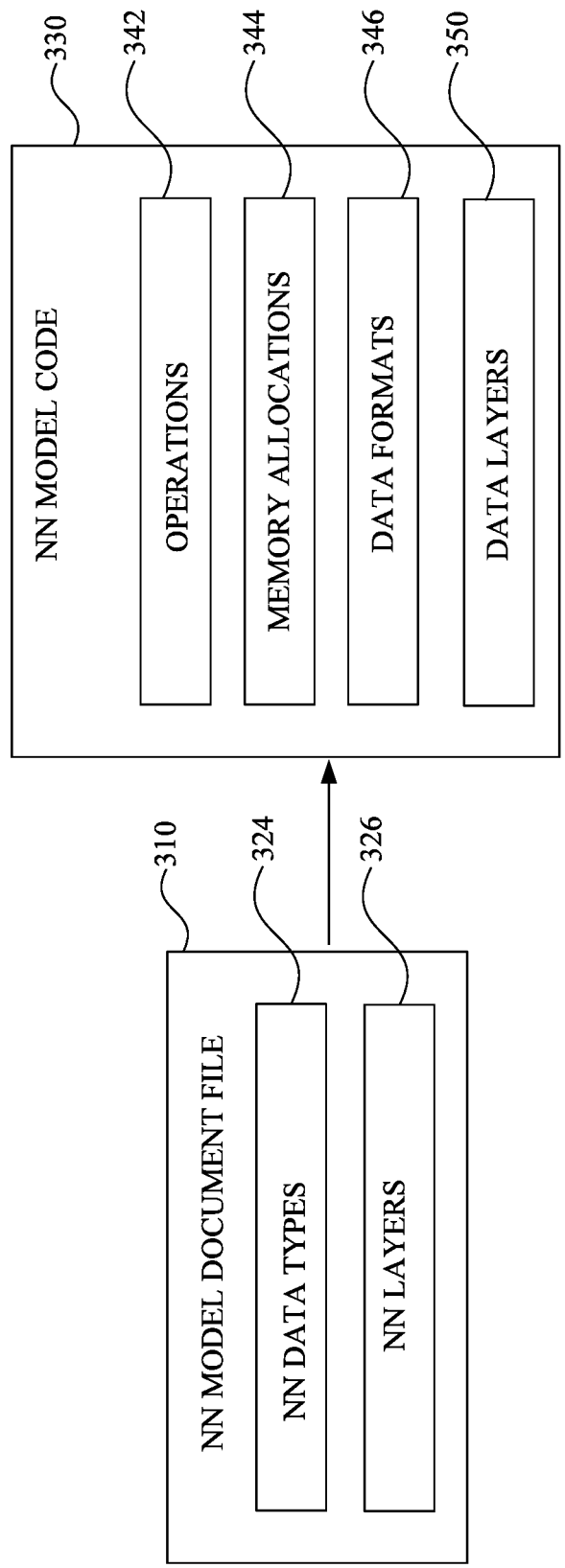
FIG. 3 illustrates an example model format for a neural network (NN) model document file and corresponding NN model code in accordance with one or more implementations.

FIG. 3 illustrates an example model format of data for an existing NN model document file and corresponding NN model code in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As discussed herein, a neural network (NN) is a computing model that uses a collection of connected nodes to process input data based on machine learning techniques. Neural networks are referred to as networks because they may be represented by connecting together different operations. A model of a NN (e.g., feedforward neural network) may be represented as a graph representing how the operations are connected together from an input layer, through one or more hidden layers, and finally to an output layer, with each layer including one or more nodes, and where different layers perform different types of operations on respective input. It is appreciated, however, that other types of neural networks are contemplated by the implementations described herein. For example, a convolutional neural network (CNN) may be provided for execution on a given specialized processor. Further, a NN as mentioned herein can also refer to a deep neural network corresponding to a neural network with multiple hidden layers. The number of layers and the number of nodes per layer may be set as part of the neural network architecture. The settings (e.g., number of layers, connections between nodes of layers, etc.) for the architecture of a neural network are also referred to as hyperparameters.

As mentioned above, an existing NN model (e.g., a given NN model document file) may be converted to code in a programming language and compiled as a binary for deployment on a target platform, such as the wireless audio output device 104. As illustrated, a NN model document file 310 represents an existing NN model with information in a different format from the programming language. In an example, the NN model document file may conform to a particular model specification. The NN model document file 310 may include NN data types 324 of NN data (e.g., input features, output values, etc.), and information for one or more NN layers 326. The NN data types 324 may include information for data types or data structures (e.g., vector, matrix, array, etc.). The NN layers 326 include information regarding the structure of the NN model such as a number of layers and a number of nodes per layer, connections between nodes of layers, and functions or operations that are performed at each of the nodes in the layers of the NN model. In an example, each layer in the NN layers 326 includes a name, a layer type (e.g., input layer, convolutional layer, pooling layer, rectified linear unit layer, and fully connected layer), a list of input names, a list of output names, and a collection of parameters specific to the layer type.

The converted NN model code 330 includes code, in a particular programming language (e.g., C) representing the aforementioned information from the NN model document file 310. For example, the converted NN model code 330 includes operations 342, memory allocations 344, data formats 346 and data layers 350. The operations 342 correspond to respective operations performed at each layer of the NN. In an example, the operations 342 may include code, for each layer of the NN, of a respective function call for performing an operation and/or a set of parameters for the function call. The data formats 346 (e.g., data blobs, arrays, array of arrays, matrices) may correspond to code corresponding to the NN data types 324 and/or include code for specifying a compatible binary format for NN data that is to utilized by a given specialized processor of a target platform (e.g., the wireless audio output device 104). The data layers 350 may correspond to code for each layer of the NN, and the memory allocations 344 correspond to code for allocating memory portions based on a determined size of each layer of the NN and/or based on an amount of memory available at the target device. Determining a respective size of each layer of the NN is discussed in more detail further below in FIG. 5.

When analyzing a NN model document file, the code generator 230 can perform various optimizations in order to generate code that is smaller and that may run more efficiently on a specialized processor such as a resource-constrained processor. For example, the code generator 230, when analyzing the NN model document file, can perform an operation fusion optimization in which multiple operations are combined into the same code segment or function call. For example, the code generator 230 can perform a vertical fusion optimization in which multiple operations (e.g., 2 to 3 operations) are combined. For example, a set of given operations may be denoted as the following:

(1) $Z$=ReLU of $X$ (2) $A$=convolution of $Z$

The code generator 230 can determine that if the result of the operations (1) and/or (2) are not used by other operations (or layers), then the code generator 230 can combine the aforementioned operations into a single combined operation, as denoted by the following:

(3) $A$=convolution of ReLU of $X$

The code generator 230 may further perform a graph coloring optimization on the NN model document file. Graph coloring, as referred to herein, refers to an optimization for memory allocation of layers of the neural network that involves, in an example, determining which memory allocations are reused by the layers. An example of a memory allocation technique is described in further detail in FIG. 5 below.

In an implementation, the code generator 230 can further generate code for debugging purposes including, for example, data for testing the network and/or a set of compilation flags and metadata to indicate that the binary is to be compiled for debugging or testing purposes.

In an implementation, the code generator 230 can also perform quantization of data that is included in the neural network based on, for example, an amount of memory (and/or other resources) available at the target device, e.g., a resource-constrained processor. In an example, such data may be in a floating point format which provides a precision of 32 bits of data in some computing architectures. In some instances, the functionality of the network is not impacted if the format of the data is in a different format that uses a less amount of bits (e.g., lower precision) than the aforementioned 32 bits for a floating point value. The code generator 230 therefore can perform a quantization optimization for floating point data and generate code in a data format that uses a smaller amount of bits (e.g., 16 bits, 8 bits, 4 bit, etc.).

The following discussion relates to examples of code generated, by the code generator 230 of the ML framework 220, from a given neural network model document.

The following example code defines a struct (e.g., user defined data type) in the C programming language for a neural network including code indicating an operation and/or layer type each layer of the neural network:

```
struct EspressoGen::model::network {
    network( );
    ~network( );
    void run( );
    void test( );
    // Input/output blobs
        Espresso::blob_f4 input1 = nullptr;
        Espresso::blob_f4 output1 = nullptr;
    // network
    static const size_t n_layers = 14;
    static const size_t n_blobs = 15;
    float gflops = 0.00014437000208999962;
private:
        Espresso::batchnorm_kernel_cpu k_0;
        Espresso::transpose_kernel_cpu k_1;
        Espresso::convolution_kernel_cpu k_2;
        Espresso::pool_kernel_cpu k_3;
        Espresso::convolution_kernel_cpu k_4;
```

```
            Espresso::pool_kernel_cpu k_5;
            Espresso::convolution_kernel_cpu k_6;
            Espresso::pool_kernel_cpu k_7;
            Espresso::transpose_kernel_cpu k_8;
            Espresso::transpose_kernel_cpu k_9;
            Espresso::flatten_kernel_cpu k_10;
            Espresso::inner_product_kernel_cpu k_11;
            Espresso::inner_product_kernel_cpu k_12;
            Espresso::softmax_kernel_cpu k_13;
    Espresso::base_kernel* kernels[14];
    Espresso::abstract_blob_container blobs[15];
    Espresso::layer_data dsts[14];
    Espresso::layer_data srcs[14];
    int64_t last_run_time;
};
```

The following code defines static allocations of storage for data from the layers of the neural network, which in an example are determined based on an amount of memory of a target device (e.g., the wireless audio output device 104):
static unsigned char buffer_color_0[625*4];
static unsigned char buffer_color_1[976*4];

The following code defines various binary formats for data (e.g., blob shapes, blob topology, etc.), which may be the result of graph coloring optimizations performed by the code generator 230:

```
// Binary format for blob shapes
static int shapes[15][5] = { //16
    {1,1,5,1,125}, // input1
    {1,1,5,1,125}, // batch_normalization_1_output
    {125,1,5,1,1}, //
batch_normalization_1_permute_conv1d_1_output
    {122,1,8,1,1}, // activation_1_output
    {61,1,8,1,1}, // max_pooling1d_1_output
    {58,1,8,1,1}, // activation_2_output
    {29,1,8,1,1}, // max_pooling1d_2_output
    {26,1,8,1,1}, // activation_3_output
    {13,1,8,1,1}, // max_pooling1d_3_output
    {1,1,8,1,13}, // max_pooling1d_3_permute_flatten_1_output
    {1,13,8,1,1}, // flatten_1_output__permute__
    {1,1,104,1,1}, // flatten_1_output
    {1,1,256,1,1}, // activation_4_output
    {1,1,7,1,1}, // dense_2_output
    {1,1,7,1,1}, // output1
};
// Binary format for blob topology
// For each layer: <n dst blobs> ids.. <n src blobs> ids..
static unsigned short topology_bin_info[ ] = {
    1,1,1,0, // batch_normalization_1
    1,2,1,1, // batch_normalization_1_permute_conv1d_1
    1,3,1,2, // conv1d_1
    1,4,1,3, // max_pooling1d_1
    1,5,1,4, // conv1d_2
    1,6,1,5, // max_pooling1d_2
    1,7,1,6, // conv1d_3
    1,8,1,7, // max_pooling1d_3
    1,9,1,8, // max_pooling1d_3_permute_flatten_1
    1,10,1,9, // flatten_1___permute___
    1,11,1,10, // flatten_1
    1,12,1,11, // dense_1
    1,13,1,12, // dense_2
    1,14,1,13, // activation_5
};
// Binary format for coloring allocator
static unsigned short colors_bin_info[ ] = {
    8, // color = 0
    0, // input1 shape=((125, 1, 5, 1, 1)) size=625
    2, // batch_normalization_1_permute_conv1d_1_output
shape=((1, 1, 5, 1, 125))
size=625
    4, // max_pooling1d_1_output shape=((1, 1, 8, 1, 61)) size=488
    12, // activation_4_output shape=((1, 256, 1, 1)) size=256
    6, // max_pooling1d_2_output shape=((1, 1, 8, 1, 29)) size=232
    8, // max_pooling1d_3_output shape=((1, 1, 8, 1, 13)) size=104
    10, // flatten_1_output___permute___ shape=((1, 1, 8, 13, 1))
size=104
    14, // output1 shape=((1, 7, 1, 1)) size=7
    7, // color = 1
    3, // activation_1_output shape=((1, 1, 8, 1, 122)) size=976
    1, // batch_normalization_1_output shape=((125, 1, 5, 1, 1))
size=625
    5, // activation_2_output shape=((1, 1, 8, 1, 58)) size=464
    7, // activation_3_output shape=((1, 1, 8, 1, 26)) size=208
    9, // max_pooling1d_3_permute_flatten_1_output
shape=((13, 1, 8, 1, 1))
size=104
    11, // flatten_1_output shape=((1, 104, 1, 1)) size=104
    13, // dense_2_output shape=((1, 7, 1, 1)) size=7
};
```

In an example, dependency information between respective layers of the network can be indicated in the following code:

static unsigned short topology_bin_info[ ]={1,3,1,2}

In the above code examples, each line of code in a similar syntax corresponds to an operation of a given neural network model. By way of example, in order 1,3,1,2 for a line: 1 is the number of output blobs/tensors, 3 is the index of the output blob, 1 is the number of input blobs, and 2 the index of the input blob.

Although examples described herein pertain to generating code in the C programming language, it is appreciated that this is only one possible target of the compiler. In an implementation, the compiler of the subject technology may generate a LLVM IR (intermediate representation) or binary.

By compiling a given neural network model to a binary and pruning off all the non-used configurations of any operations as described herein, the subject technology is enabled to run neural networks without utilizing a deep learning or machine learning framework on embedded processors (e.g., the specialized processor 252) with limited memory (e.g., in ~10 s of kB), by selecting portions of the framework (e.g., the ML framework 220) that are utilized for an inference task (or other machine learning task) of such networks.

As discussed herein, a convolutional neural network refers to a particular type of neural network, but uses different types of layers made up of nodes existing in three dimensions where the dimensions may change between layers. In a convolutional neural network, a node in a layer may only be connected to a subset of the nodes in a previous layer. The final output layer may be fully connected and be sized according to the number of classifiers. In an example where a convolutional neural network performs image classification for digital images representing digits, an example final output layer may have dimensions of [1×1×10]. In another example, a dimension of an final output layer for convolutional neural network that identifies 500 different objects (e.g., cats, dogs, people, bridges, etc.) in an image may have dimensions of [1×1×500].

As discussed herein, a convolutional neural network model may include various combinations, and in some instances, multiples of each, and orders of the following types of layers: the input layer, convolutional layers, pooling layers, rectified linear unit layers (ReLU), and fully connected layers. Part of the operations performed by a convolutional neural network includes taking a set of filters (or kernels) that are iterated over input data based on one or more parameters. In an example, the depth of a convolutional layer may equal the number of filters used. It is appreciated that the sizes of the different volumes at each layer may be mathematically determined given the hyperparameters of a convolutional neural network.

In an example, convolutional layers read input data (e.g., a 3D input volume, a 2D image, or a 1D signal), using a kernel that reads in small segments at a time and steps across the entire input field. Each read can result in an input that is projected onto a filter map and represents an internal interpretation of the input. Convolutional neural networks can be applied to human activity recognition data (e.g., sensor data corresponding to motion or movement) where a convolutional neural network model learns to map a given window of signal data to an activity where the model reads across each window of data and prepares an internal representation of the window.

Convolutional neural networks are often run on cloud-based computing platforms due to the volume of data being processed. In such instances, memory management is often an after-thought because cloud-based systems do not have practical memory concerns (e.g., more computing power/memory is readily available). In contrast, storing all the weights and resulting node values of convolutional neural network in memory on a resource/memory limited/constrained device (e.g., a mobile electronic device such as a smartphone) may not be possible or practical.

Figure 4:
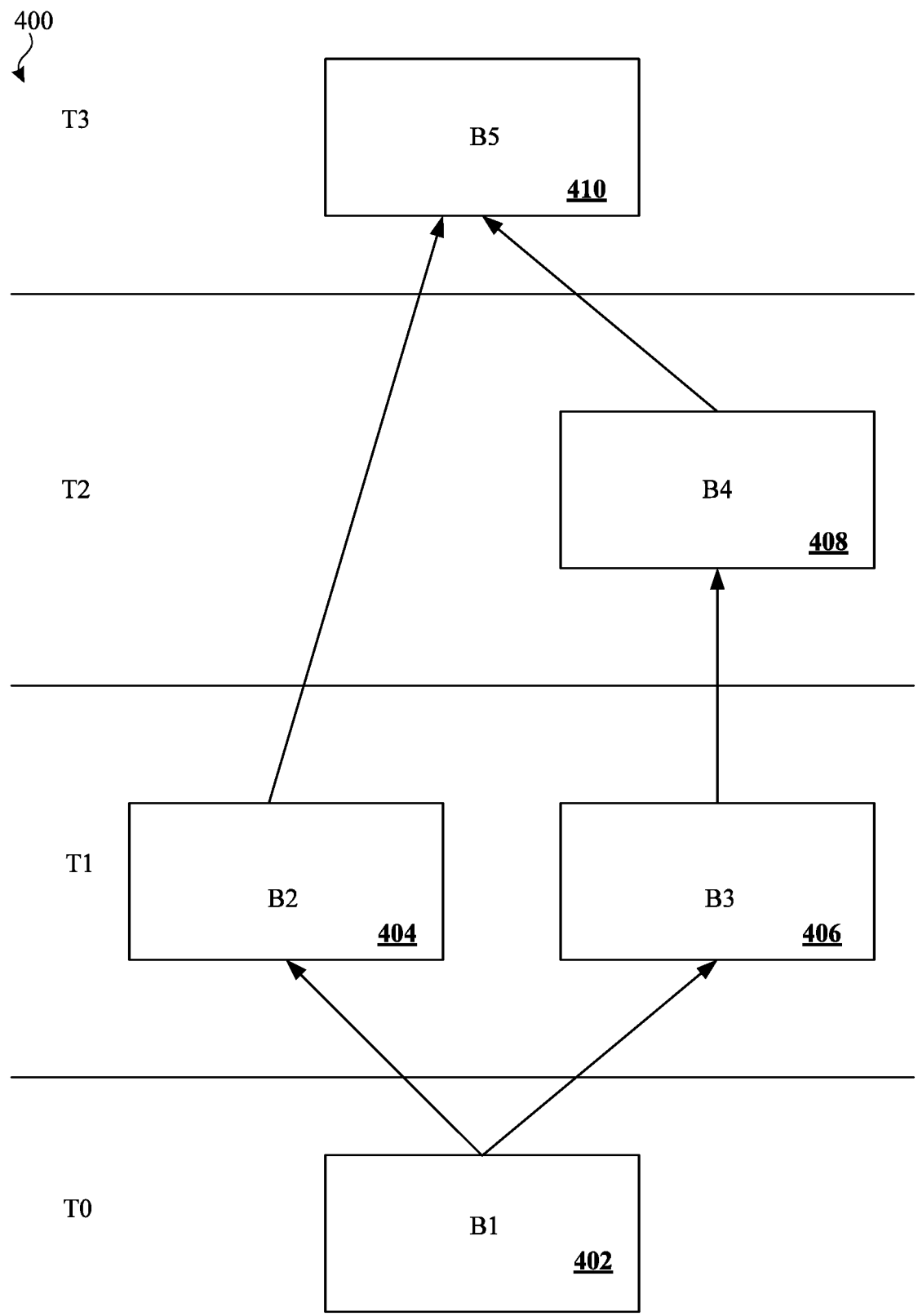
FIG. 4 illustrates an example of a convolutional neural network in accordance with one or more implementations.

FIG. 4 illustrates an example of a convolutional neural network 400 in accordance with one or more implementations.

As shown in the example of FIG. 4, the convolutional neural network 400 illustrates intermediate data layers 402, 404, 406, 408, and 410. For the purpose of explanation, the intermediate data layers are illustrated as 2D objects, but it is appreciated that the intermediate data layers may correspond to 3D input volumes. The intermediate data layers 402, 404, 406, 408, and 410 may be different types of layers such as convolutional layers, ReLU layers, etc. Accordingly, different intermediate data layers may have different dimensions. Different computing architectures may store the intermediate data layers in different formats. For example, when a convolutional neural network is processed on a specialized processor (e.g., motion processor), the input data can be represented and stored in a particular binary format that is compatible with the architecture of the specialized processor.

Convolutional neural network 400 is illustrated along a vertical temporal axis starting at t0 and ending at t3. The axis illustrates the different, relative, times intermediate data layers may be processed by an electronic device. For example, intermediate data layer 402 may be processed first, and then both intermediate data layer 404 and intermediate data layer 406 are processed in parallel at t1.

Convolutional neural network 400 also illustrates the dependencies between different intermediate data layers. Thus, intermediate data layer 404 and intermediate data layer 406 both use the output of intermediate data layer 402; intermediate data layer 408 uses the output of intermediate data layer 406; and intermediate data layer 410 uses the output of intermediate data layer 408 and intermediate data layer 404. In an implementation, the hyperparameters and architecture (e.g., number of layers and how the layers are connected) of convolutional neural network 400 may be included with the code of the network as discussed before in FIG. 2 and FIG. 3. In various examples, the convolutional neural network 400 may be executed on a specialized processor of a single electronic device (e.g., mobile device, laptop computer, desktop computer).

The dependencies between the layers of convolutional neural network 400 may be used to deduce the minimum number of memory allocations needed to execute the convolutional neural network. Once the dependencies are known, the code generator 230 can determine at a particular execution point whether or not the output from a data layer will be needed in the future. If the output is needed, then a memory allocation may be required to hold the output until whatever intermediate data layer needs it has used the output. In an example, the minimum number of memory allocations is based on the largest number of memory allocations needed to hold the depended upon outputs during execution of the convolutional neural network. A visualization of the results (e.g., in tabular format) of the deduction process when performed by the code generator 230 is illustrated in FIG. 5.

Figure 5:
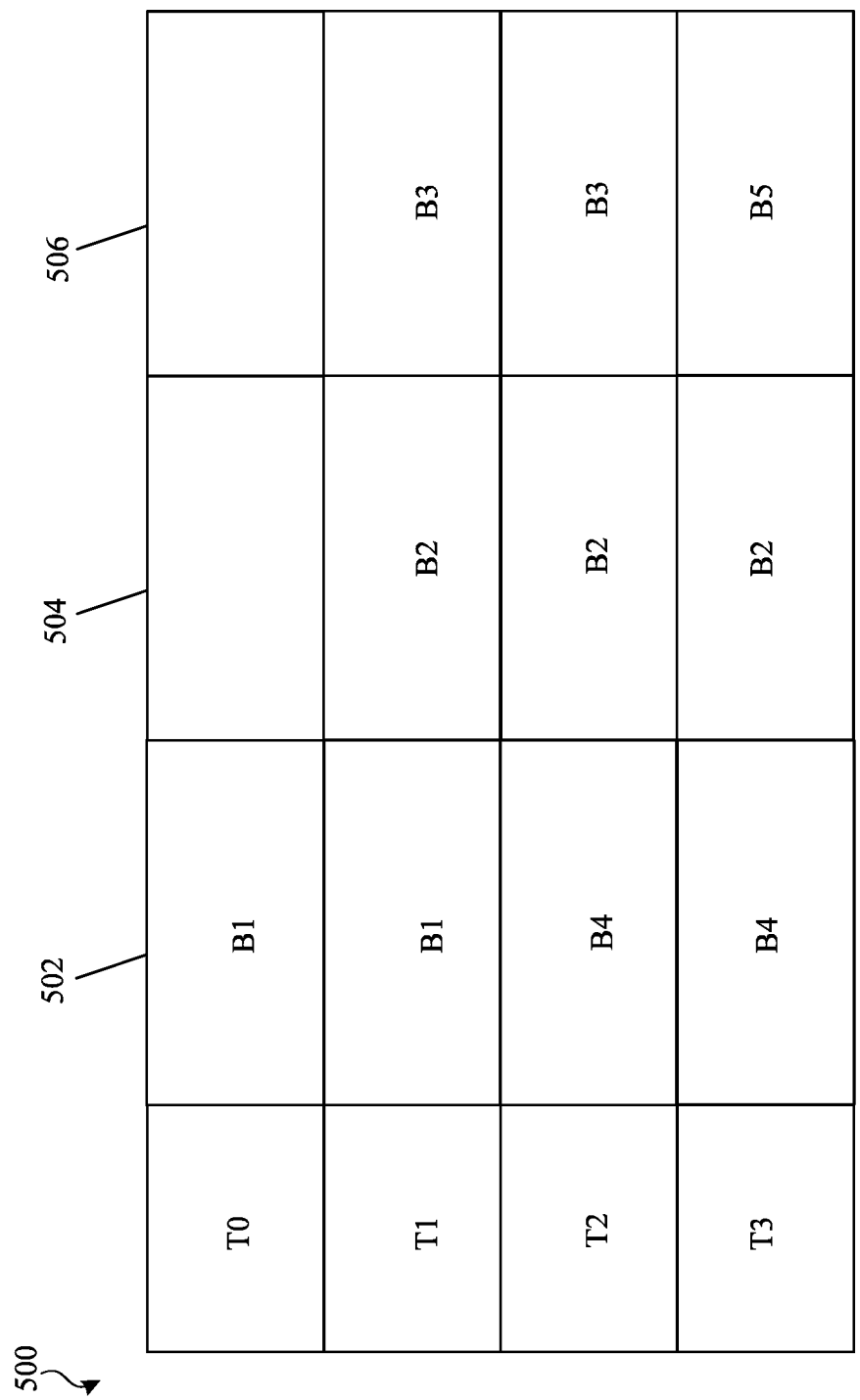
FIG. 5 illustrates an example table of memory allocations in accordance with one or more implementations.

FIG. 5 illustrates an example table 500 of memory allocations in accordance with one or more implementations. The rows of the table 500 correspond to times t0 through t3. The columns of table 500 represent three different memory allocations, memory allocation 502, memory allocation 504, and memory allocation 506. The labels B1, B2, B3, B4, and B5 correspond to intermediate data layer 402, intermediate data layer 404, intermediate data layer 406, intermediate data layer 408, and intermediate data layer 410.

The following discussion references times (e.g., t0) as if the convolutional neural network was actually running. However, the code generator 230 performs the deduction process without actually running the convolutional neural network based on information of dependency and relative order of execution time of operations in the network. The dependency information may be generated as part of the code corresponding to the convolutional neural network. For example, the dependency information for convolutional neural network 400 may be represented as:

B1: B2, B3
B2: B5
B3: B4
B4: B5
B5: Null (e.g., the output of B1 is used by B2 and B3, the output of B2 is used by B5, etc.)

The following discussion describes how the code generator 230 determines memory allocations for the network. In one or more implementations, the total amount of memory available for allocation may be determined based at least in part on an amount of available memory of a given target device, e.g., a specialized processor provided by the wireless audio output device 104. For example, the code generator 230 may utilize information regarding a total amount of available memory of the target device (e.g., the wireless audio output device 104), which could be provided in database or another source such as a table (e.g., lookup table) that includes respective entries for various target devices and relevant information regarding hardware capabilities (e.g., minimum and/or maximum memory allocation sizes, etc.) and amounts of total memory for such target devices. The code generator 230, in an implementation, can track the available amount of memory with respect to the total amount of memory of the target device in view of previous (if any) allocations for the network.

For example, beginning at t0, a first memory allocation, memory allocation 502, is used to hold the data for B1. Then, at t1 both intermediate data layer 404 (B2) and intermediate data layer 406 (B3) need memory allocations. Accordingly, the code generator 230 can perform a check to determine what is stored in memory allocation 502. As previously stated, B1 is currently stored in memory allocation 502. Then, the code generator 230 can access the dependency information to determine if B1 is used by other intermediate data layers of the network. In this example, B1 is used by both B2 and B3. Accordingly, memory allocation 502 may not be assigned to B2 or B3. Consequently, two new memory allocations are needed, memory allocation 504 and memory allocation 506. These allocations are assigned B2 and B3, respectively, by the code generator 230.

Moving to t2, intermediate data layer 408 (B4) needs a memory allocation. Again, a check may be made to see if an existing memory allocation may be reused. B1 is still in memory allocation 502, but because both B2 and B3 are now complete, the data from B1 is not needed. Accordingly, memory allocation 502 may be reassigned to B4. Similarly, at t3, memory allocation 506 may be reassigned to B5 because B3 is no longer needed. Therefore, based on the dependency information, the code generator 230 can deduce that a minimum number of three memory allocations is needed to execute the convolutional neural network 400, which is the largest number needed at any point after walking through the dependency tree (e.g., performing a mock execution of the convolutional neural network by the code generator 230).

The code generator 230 can also determine which intermediate data layers are assigned to a memory allocation during execution and generate code for such a memory allocation. For example, both B1 and B4 were used by memory allocation 502. The assignment information may be determined at the same time it is determined how many memory allocations are needed.

Next, the code generator 230 can determine the needed memory storage size of each of the minimum number of memory allocations. Different computing architectures may allocate memory in different ways. For example, some computing architectures permit linear memory allocations such as in some types of specialized processors. Similarly, different computing architectures can have different requirements for the minimum or maximum size of memory allocations. As described above, the code generator 230 may determine a total amount of available memory on the target device (e.g., the wireless audio output device 104) in order to determine an amount of available memory for respective memory allocations and in view of previous (if any) allocations (e.g., which would potentially reduce the amount of available memory).

In an implementation, the code generator 230 can iterate through each memory allocation to determine the amount of memory storage to reserve. Thus, with reference back to FIG. 4, the code generator 230 may examine the underlying intermediate data layers of B1 and B4. As discussed previously, each intermediate data layer may be considered a 3D input volume. In an example, the code generator 230 can determine the memory storage needed for an intermediate data layer based on a product of the dimensions of the intermediate data layer and a size of the data at entry point in the volume. Additionally, the code generator 230 can check a resource constraint for the target device (e.g., the total amount of memory and the current available amount of memory on the wireless audio output device 104) to further determine whether the needed size of memory for such allocations is possible, and if so, generate code for the memory allocations accordingly.

Some computer architectures may permit memory allocation using linear memory. In such instances, the code generator 230 can determine the size of the memory allocation based on the maximum total size of an intermediate data layer for any layers that are to reuse the memory (allocation. For example, this can be expressed as max $W_{B1}W_{B4}$). In other instances, where textures or linear memory may not be used, the code generator 230 can determine the size based on both the maximum width and height of the storage texture. For example, this can be expressed as max($W_{B1}H_{B1}$, $W_{B4}H_{B4}$). The code generator 230 can determine an amount of allocated memory space needed based on depth information of a volume. For example, the code generator 230 can process a [32×32×3] volume as three, consecutive [32×32] arrays (e.g., a [32×96]) volume when determining the size of memory allocations. Additionally, the code generator 230 can check a resource constraint for the target device (e.g., the total amount of memory and the current available amount of memory on the wireless audio output device 104) to further determine whether the needed size of memory for such allocations is viable, and if so, generate code for such allocations.

Figure 6:
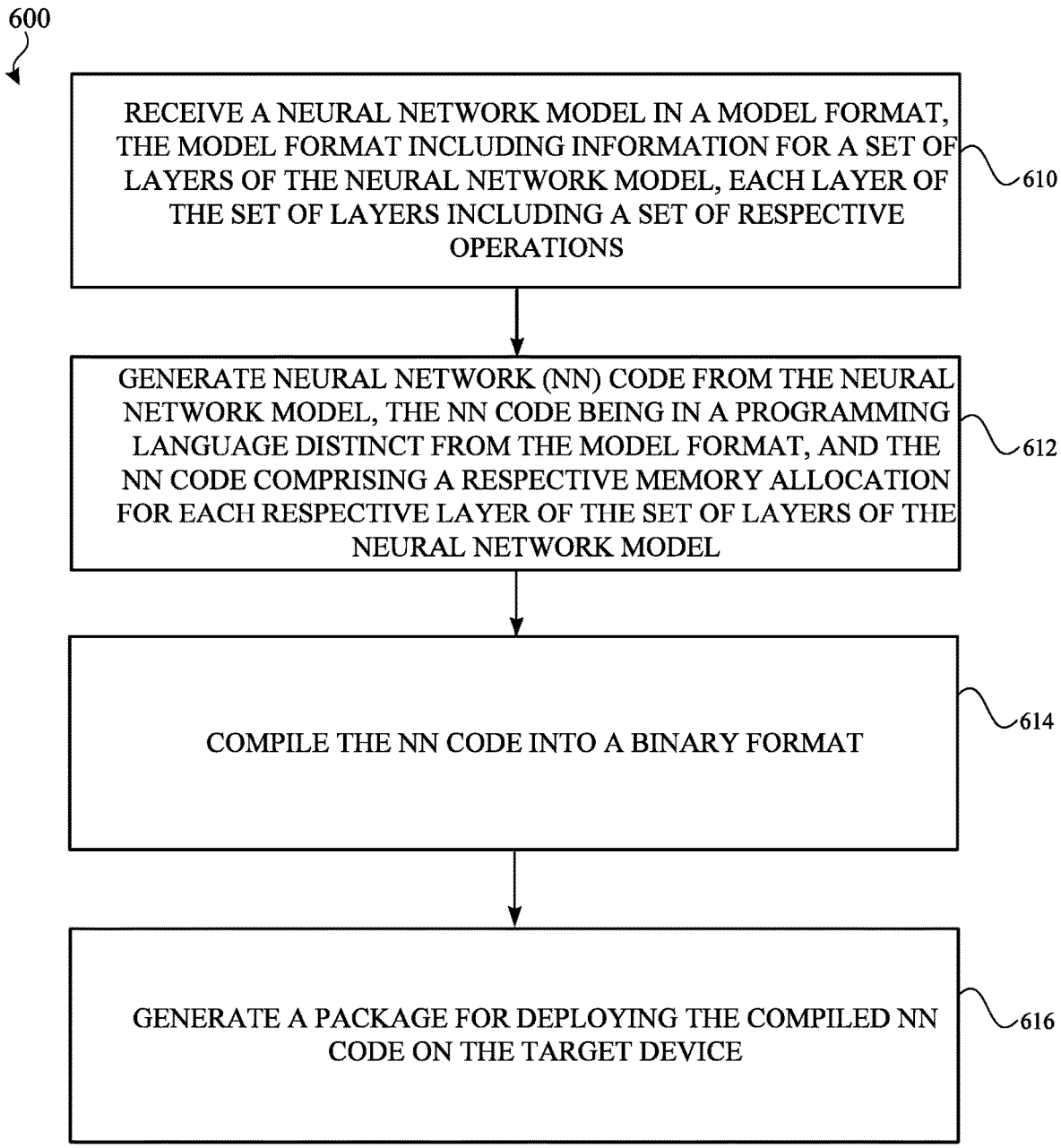
FIG. 6 illustrates a flow diagram of an example process for generating code for a neural network model in accordance with one or more implementations.

FIG. 6 illustrates a flow diagram of an example process 600 for generating code for a neural network model in accordance with one or more implementations. For explanatory purposes, the process 600 is primarily described herein with reference to components of the software architecture of FIG. 2, which may be executed by one or more processors of the electronic device 110 of FIG. 1. However, the process 600 is not limited to the electronic device 110, and one or more blocks (or operations) of the process 600 may be performed by one or more other components of other suitable devices, such as by the electronic device 115. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The ML framework 220 receives a neural network model in a model format, the model format including information for a set of layers of the neural network model, each layer of the set of layers including a set of respective operations (610). In an example, the NN model includes multiple layers that include operations that are executable on a specialized processor of a target platform. The target platform, in an example, may be a different electronic device, such as the wireless audio output device 104.

The code generator 230 generates neural network (NN) code from the neural network model, the NN code being in a programming language distinct from the model format, and the NN code comprising a respective memory allocation for each respective layer of the set of layers of the neural network model (612). In an example, the code includes particular code (e.g., C code) corresponding to allocations of memory for each layer of the set of layers. Moreover, determining the respective memory allocation for each respective layer is based at least in part on a resource constraint (e.g., a total amount of memory and/or an amount of available memory) of a target device (e.g., the wireless audio output device 104).

The neural network compiler 215 compiles the NN code into a binary format (614). In an example, the binary format is compatible with the hardware architecture of the specialized processor of the target platform (e.g., the wireless audio output device 104).

The neural network compiler 215 generates a package for deploying the compiled NN code on the target device (616).

Figure 7:
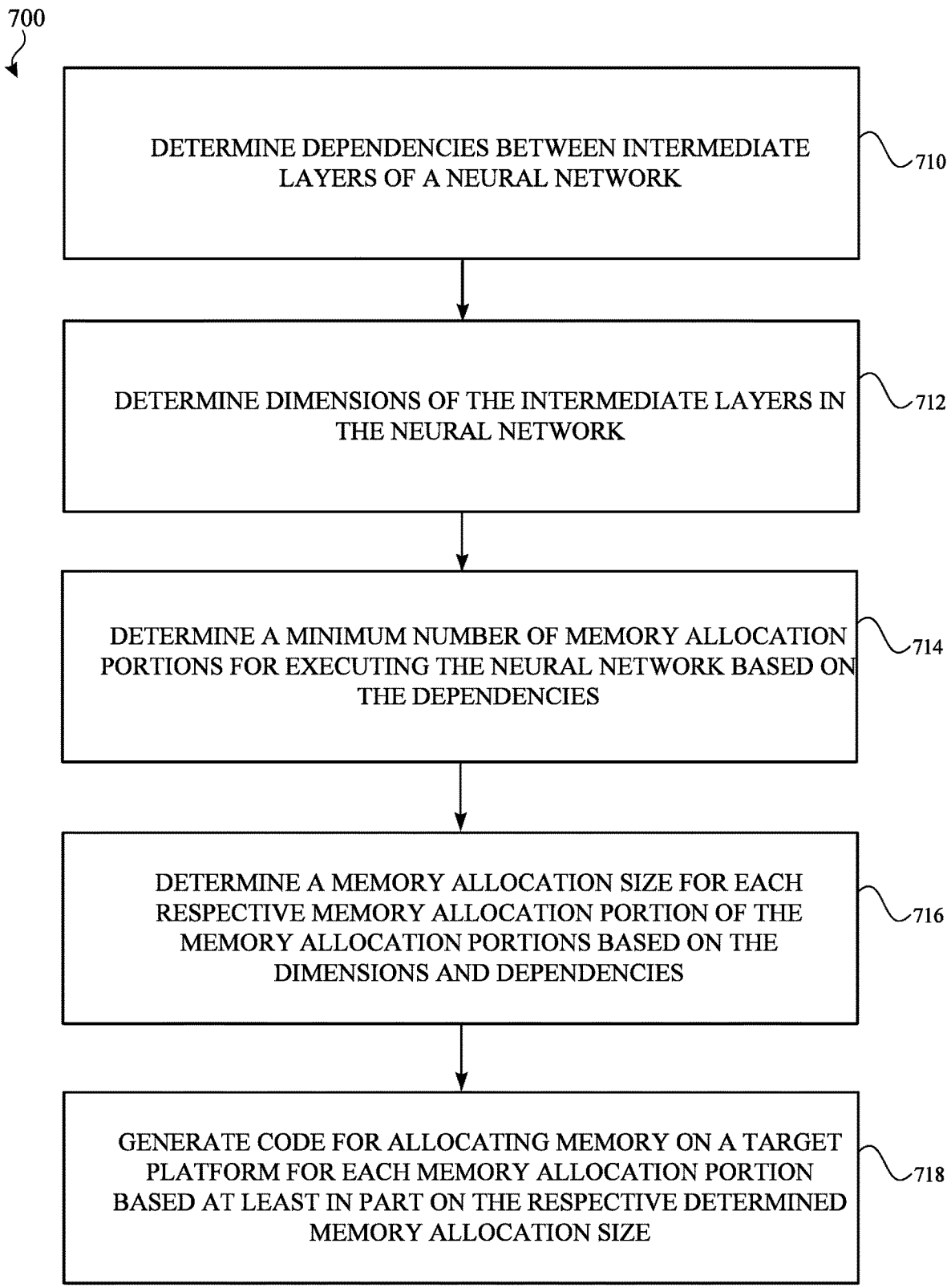
FIG. 7 illustrates an example process for determining memory allocations for generating code for a convolutional neural network in accordance with one or more implementations.

FIG. 7 illustrates an example process 700 for determining memory allocations for generating code for a convolutional neural network in accordance with one or more implementations. For explanatory purposes, the process 700 is primarily described herein with reference to components of the electronic device shown in FIG. 2, which may be executed by one or more processors of the electronic device 110 of FIG. 1. However, the process 700 is not limited to the electronic device 110, and one or more blocks (or operations) of the process 700 may be performed by one or more other components of other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The code generator 230 determines dependencies between intermediate data layers of a neural network (710). In an example, the neural network is a convolutional neural network based on a NN document file (e.g., from the neural network model document files 244). NN document file may identify the number of intermediate data layers, dependencies between the layers, the dimensions (e.g., height, width, depth) of each layer, and the order of execution of the layers. In some examples, ML framework 220 is configured to analyze the NN document file.

The code generator 230 determines dimensions of the neural network (712). In some examples the sizes of the intermediate data layers are obtained from the metadata. In some examples, the sizes of the intermediate data layers are calculated based on hyperparameters for the neural network.

The code generator 230 determines a minimum number of memory allocation portions for executing the neural network based on the dependencies (714). The minimum number of memory allocation portions may be deduced from the order of the intermediate data layers within the neural network. For example, if three later intermediate data layers use data from an earlier intermediate data layer, the data in the earlier intermediate data layer may be stored at least until the execution of the three later intermediate data layers. In an example, the minimum number of dependencies is stored as part of the metadata for the neural network. Further, the code generator 230 determines designations for assigning intermediate data layers to the memory allocation portions. In an example, this is accomplished by traversing the architecture as if the neural network was run to determine which intermediate data layer is stored in which data storage portion as the neural network would be run. Additionally, more than one intermediate data layer may be designated to a memory allocation portion. In some examples, different memory allocation portions are designated for different intermediate data layers. The resulting designations may be stored as a table that identifies the intermediate data layer and the memory allocation portion designated for the intermediate data layer.

The code generator 230 determines determine a memory allocation size for each respective memory allocation portion of the memory allocation portions based on the dimensions and dependencies (716). The code generator 230 generates a memory allocation size for each respective data storage portion is determined based on the dimensions and dependencies. For example, the dependencies may dictate which intermediate data layer are assigned to the memory allocation portions as discussed above. Then, the dimensions of the intermediate data layer(s) assigned to the respective memory allocation portions may be examined to determine the largest intermediate data layer by volume. The memory allocation size for the respective memory allocation portion may be set to at least the size of the largest intermediate data layer. The type of executing environment may affect the memory allocation size. For example, the memory allocation size may be more than the size of the largest intermediate data layer if memory may not be allocated using textures or linearly.

The code generator 230 generates code for allocating memory on the target platform (e.g., the wireless audio output device 104) for each memory allocation portion based at least in part on the respective determined memory allocation size (718).

When the compiled and deployed to a target device, such as the wireless audio output device 104, memory on the target device can be allocated for each memory allocation portion of the neural network in accordance with its respective determined memory allocation size. After allocation, the designation table between intermediate data layers and data storage portions may be updated to include the memory addresses for the allocated memory. In an example, the memory for the data storage portions is allocated as a contiguous block, but virtually split into the number of memory portions. During execution of the neural network, a pointer may be moved around the block corresponding to the memory portions in the contiguous block.

Figure 8:
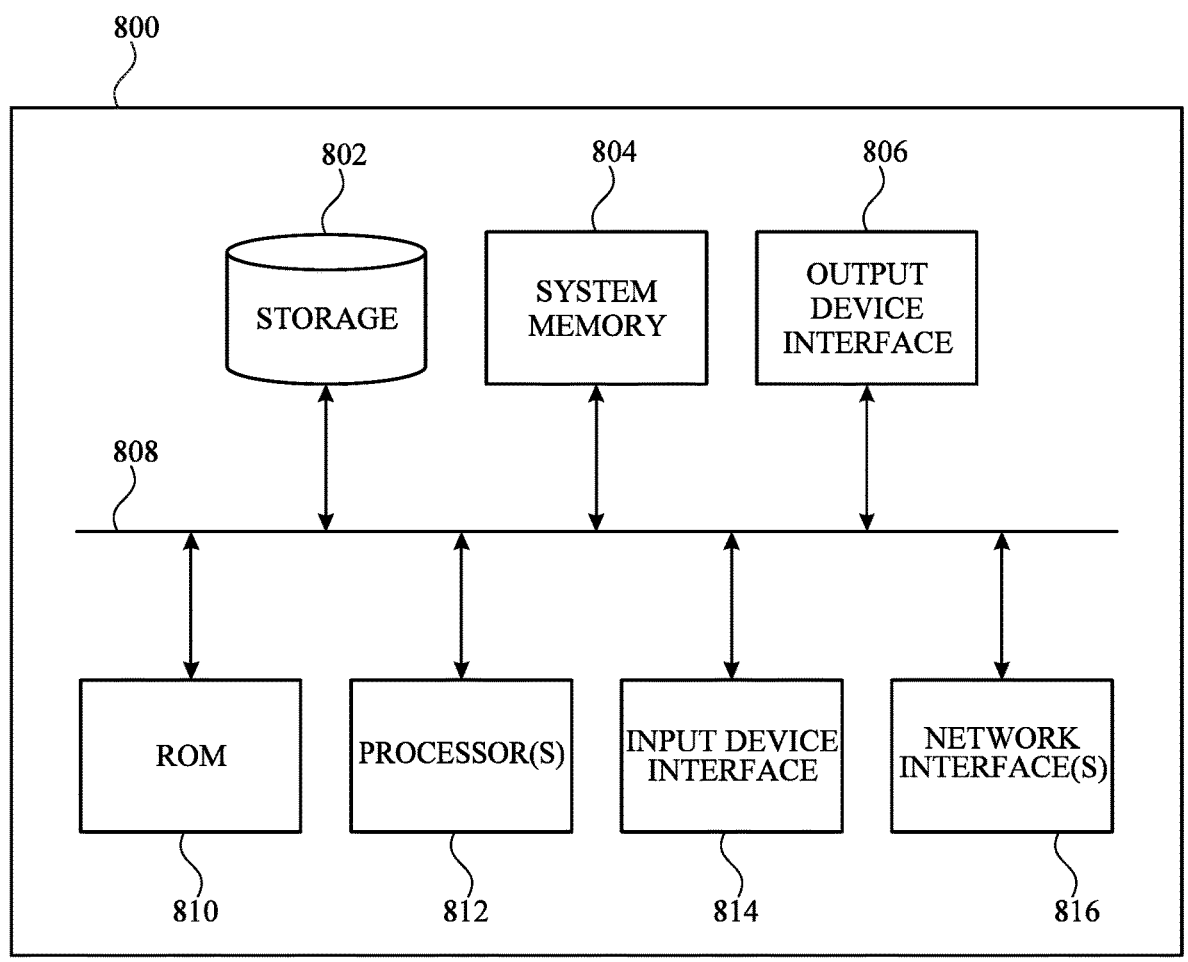
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, the electronic device 115, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 115 shown in FIG. 1, through the one or more network interface (s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

One aspect of the present technology may include the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving, at a device, a neural network model in a model format, the model format including information for a set of layers of the neural network model, each layer of the set of layers including a set of respective operations;
   generating, at the device, neural network (NN) code from the neural network model, the NN code being in a programming language distinct from the model format, and the NN code comprising a respective memory allocation for each respective layer of the set of layers of the neural network model, wherein the generating comprises determining the respective memory allocation for each respective layer based at least in part on a resource constraint of a target device that is separate from the device;
   compiling, at the device, the NN code into a binary format, the compiling comprising pruning a set of non-used configurations of operations of the neural network model; and
   generating, at the device, a package for deploying the compiled NN code on the target device for execution by a specialized processor of the target device.

2. The method of claim 1, wherein the model format comprises a NN model document file in a particular specification for a neural network, and the programming language is an imperative programming language.

3. The method of claim 1,
   wherein the package is executed by the target device on the specialized processor without utilizing a machine learning framework.

4. The method of claim 1, wherein generating the NN code further comprises:
   determining dependencies between intermediate layers of the neural network model;
   determining dimensions of the intermediate layers in the neural network model;
   determining a minimum number of memory allocation portions for executing the neural network model based on the dependencies;
   determining a memory allocation size for each respective memory allocation portion of the memory allocation portions based on the dimensions and dependencies; and
   generating code for allocating memory on the target device for each memory allocation portion based at least in part on the respective determined memory allocation size, wherein the NN code comprising the code.

5. The method of claim 1, wherein generating the NN code further comprises generating a set of compiler flags or a set of testing data for including in the compiled NN code.

6. The method of claim 1, wherein generating neural network (NN) code from the neural network model further comprises:
   determining a set of operations to execute in a sequential manner in an execution flow of the neural network model, the set of operations being determined based on a lack of dependency among the set of operations; and
   combining the set of operations for compiling.

7. The method of claim 1, wherein the set of layers includes a set of intermediate data layers, and for each respective intermediate data layer of the set of intermediate data layers:
   generating respective code allocating a respective portion of memory for the respective intermediate data layer, wherein allocating the respective portion of memory is based on which intermediate layers will be concurrently executing on the target device at a particular time as the respective intermediate data layer.

8. The method of claim 7, wherein a first portion of memory is allocated for a first intermediate data layer and a second portion of memory is allocated for a second intermediate data layer.

9. The method of claim 1, wherein generating NN code from the neural network model further comprises:
   quantizing operations with higher precision into respective operations with lower precisions based at least in part on the resource constraint of the target device.

10. The method of claim 1, wherein the target device includes a runtime environment that utilizes the specialized processor, the specialized processor utilizing less power than a main processor of the target device, the specialized processor having less computing ability than the main processor, and the specialized processor being always powered on, wherein the package is loaded into memory of the target device for execution by the specialized processor.

11. A system comprising;
   a processor;
   a memory device containing instructions, which when executed by the processor cause the processor to:
      receive a neural network model in a model format, the model format including information for a set of layers of the neural network model, each layer of the set of layers including a set of respective operations;
      generate neural network (NN) code from the neural network model, the NN code being in a programming language distinct from the model format, and the NN code comprising a respective memory allocation for each respective layer of the set of layers of the neural network model, wherein to generate the NN code comprises determining the respective memory allocation for each respective layer based at least in part on a resource constraint of a target device that is separate from the system;
      compile the NN code into a binary format, the compile comprising pruning a set of non-used configurations of operations of the neural network model; and
      generate a package for deploying the compiled NN code on the target device for execution by a specialized processor of the target device.

12. The system of claim 11, wherein the model format comprises a NN model document file in a particular specification for a neural network, and the programming language is an imperative programming language.

13. The system of claim 11, wherein to generate the NN code further causes the processor to:
   determine dependencies between intermediate layers of the neural network model;
   determine dimensions of the intermediate layers in the neural network model;
   determine a minimum number of memory allocation portions for executing the neural network model based on the dependencies;
   determine a memory allocation size for each respective memory allocation portion of the memory allocation portions based on the dimensions and dependencies; and
   generate code for allocating memory on the target device for each memory allocation portion based at least in part on the respective determined memory allocation size, wherein the NN code comprises the code.

14. The system of claim 11, wherein to generate the NN code further causes the processor to:
   generate a set of compiler flags or a set of testing data for including in the compiled NN code.

15. The system of claim 11, wherein to generate the NN code from the neural network model further comprises:
   quantize operations with higher precision into respective operations with lower precisions.

16. The system of claim 11, wherein to generate the NN code further causes the processor to:
   determine a set of operations to execute in a sequential manner in an execution flow of the neural network model, the set of operations being determined based on a lack of dependency among the set of operations; and
   combine the set of operations for compiling.

17. The system of claim 11, wherein the set of layers includes a set of intermediate layers, and for each respective intermediate data layer of the set of intermediate layers, further causes the processor to:
   generate respective code allocating a respective portion of memory for the respective intermediate data layer, wherein allocating the respective portion of memory is based on which intermediate layers will be concurrently executing on the target device at a particular time as the respective intermediate data layer.

18. The system of claim 17, wherein a first portion of memory is allocated for a first intermediate data layer and a second portion of memory is allocated for a second intermediate data layer.

19. The system of claim 11, wherein the target device includes a runtime environment that utilizes the specialized processor, the specialized processor utilizing less power than a main processor of the target device, the specialized processor having less computing ability than the main processor, and the specialized processor being always powered on.

20. A non-transitory computer-readable medium comprising instructions, which when executed by a computing device, cause the computing device to perform operations comprising:
   receiving, by the computing device, a neural network model in a model format, the model format including information for a set of layers of the neural network model, each layer of the set of layers including a set of respective operations;
   generating, by the computing device, neural network (NN) code from the neural network model, the NN code being in a programming language distinct from the model format, and the NN code comprising a respective memory allocation for each respective layer of the set of layers of the neural network model, wherein the generating comprises determining the respective memory allocation for each respective layer based at least in part on a resource constraint of a target device that is separate from the computing device;
   compiling, by the computing device, the NN code into a binary format, the compiling comprising pruning a set of non-used configurations of operations of the neural network model; and
   generating a package for deploying the compiled NN code on the target device for execution by a specialized processor of the target device.

\* \* \* \* \*